United States Patent Office 3,016,348
Patented Jan. 9, 1962

3,016,348
MANUFACTURE AND USE OF SULFIDED HYDRO-
CARBON PURIFICATION CATALYST
Donald L. Holden, Des Plaines, Ill., assignor to Universal Oil Products Company, Des Plaines, Ill., a corporation of Delaware
No Drawing. Filed Nov. 2, 1959, Ser. No. 850,088
6 Claims. (Cl. 208—216)

The present invention relates to a method for manufacturing a hydrocarbon purification catalyst especially adaptable for utilization in processes for the treating of contaminated hydrocarbons, mixtures of hydrocarbons and various hydrocarbon distillates or fractions. Through the utilization of this catalyst, prepared in accordance with the method herein set forth, in hydrogenation and purification processes, the immediate use of the resulting product is permitted, or the product is made suitable for use as the subsequent charge material to other processes. More specifically, the method of the present invention is directed toward the preparation of a hydrocarbon purification catalyst having hydrogenation propensities and which is especially designed to effect the removal, or destruction, of nitrogenous and sulfurous compounds within hydrocarbons and mixtures of hydrocarbons. The present invention involves the method of preparing a particular four-component catalyst by specific means which result in a catalytic composite wherein the catalytically active metallic components exist in their highest sulfided state. Therefore, one of the essential features of the present invention is the means employed to sulfide the catalyst whereby the metallic components are converted to the sulfides thereof prior to being contacted by the particular hydrocarbon to be processed and thereby purified.

The hydrocarbon purification catalyst of the present invention may be utilized to great advantage in processes designed for the preparation of saturated charge stocks, substantially free from combined sulfur and nitrogen, for use in other processes. Particularly within the petroleum industry, it is especially desirable to reform catalytically a wide variety of straight-run gasolines, natural gasolines, catalytically-cracked naphtha fractions and/or thermally-cracked hydrocarbon distillates, for the purpose of improving the anti-knock characteristics thereof. Recently, it has been found that catalytic reforming processes which utilize a catalyst consisting primarily of platinum and alumina, and particularly a catalyst which also contains combined halogen, are especially beneficial in reforming hydrocarbons and hydrocarbon fractions of the type hereinbefore set forth. The platinum-containing catalyst effects a highly desirable combination of reactions including the hydrocracking and isomerization of paraffins, the dehydrogenation of naphthenes to aromatics, and the dehydrocyclization of paraffins to aromatics; thus, such catalyst is especially efficient in increasing the octane rating or anti-knock characteristics, of various hydrocarbon fractions. Through the proper selection of operating conditions, platinum-containing catalysts may be utilized for a relatively extended period of time when processing hydrocarbon fractions that are comparatively free from various contaminants.

However, when effecting the aforesaid reactions while processing hydrocarbon charge stocks containing large concentrations of contaminants, there results a selective poisoning of the platinum catalyst, accompanied by a significant decline in the activity and stability thereof.

It is generally known that the most common contaminants, contained in a charge stock to a catalytic reforming operation, in addition to oxygenated compounds, are combined sulfur and combined nitrogen. Further, most charge stocks to catalytic reforming processes contain minor, but significantly deleterious quantities of metals such as arsenic, copper, lead, manganese, etc. These contaminants adversely affect the activity and stability of the particular platinum-containing catalyst employed. When such a charge stock is caused to contact the platinum-containing catalyst, at reforming conditions, the combined sulfur and nitrogen are released from their respective hydrocarbon molecules, and are ultimately adsorbed onto and within the platinum-containing catalyst. This adsorption results in a decline in catalytic activity in addition to the normal activity decline resulting from the inherent deposition of coke and other carbonaceous material which shields the catalytically active centers from the material being processed. Elimination of the difficulties which arise as a result of the presence of various contaminants within the reforming charge stock has been achieved with fair success through the use of suitable hydrodesulfurization catalysts in pretreating processes; metallic contaminants are removed, combined sulfur and nitrogen are converted to hydrogen sulfide and ammonia, and olefinic hydrocarbons are saturated to form paraffins and naphthenes.

Many hydrocarbon stocks, charged to catalytic reforming processes, are derived as hydrocarbon fractions, or distillates, from the liquid product resulting from cracking processes, both catalytic and thermal. There exists an abundance of these cracked stocks boiling within the gasoline boiling range, which stocks may in part be employed as motor fuel, or preferably further processed to yield a greater quantity of motor fuel of higher quality. Cracked stocks are characterized, however, by a comparatively high degree of unsaturation, and, although possessing a relatively high octane rating, are unsuitable for widespread use; in storage, they tend to form sludges, gums and varnishes. In addition, distillates obtained by cracking processes usually are characterized by an appreciable combined sulfur and nitrogen content.

As hereinbefore stated, the catalytic reforming process greatly improves the characteristics of various gasolines through a combination of reactions including dehydrogenation to form aromatic hydrocarbons, isomerization of straight-chain hydrocarbons to form more highly-branched hydrocarbons, dehydrocyclization of straight or slightly-branched chain hydrocarbons to form additional aromatic hydrocarbons and selective hydrocracking of heavier molecules to form the more desirable lighter molecules boiling within the gasoline boiling range. It becomes difficult to effect a successful reforming process on a highly unsaturated charge stock containing large quantities of sulfurous and nitrogenous compounds; the unsaturated compounds exhibit the tendency to polymerize and form a highly carbonaceous material which becomes deposited upon the reforming catalyst; as hereinbefore stated, the combined sulfur and nitrogen are released, and adsorbed by the catalytic composite.

A primary object of the present invention is to provide a catalyst for use in processes for the purification of contaminated hydrocarbons and mixtures of hydrocarbons, such that these hydrocarbons become extremely well suited as charge material to catalytic reforming processes, and particularly to those reforming processes which utilize a platinum-containing catalytic composite. The catalyst of the present invention also affords advantages to the processing of hydrocarbon fractions, such as light cycle stocks, boiling in excess of the gasoline boiling range, which cycle stocks are generally employed as fuel oils. An essential feature of the present invention, by which the above object is attained, is the utilization of precise procedures in the preparation of the catalytic composite employed in the process.

In a broad embodiment, the present invention relates to the method of preparing a hydrocarbon purification catalyst, having hydrogenation propensities, which comprises oxidizing an alumina-silica carrier material composited with nickel and molybdenum, to form nickel oxide and molybdenum oxide, and thereafter contacting the resulting alumina-silica-nickel oxide-molybdenum oxide composite with hydrogen sulfide over a temperature range of about 80° F. to about 1000° F. and in a substantially non-reducing atmosphere.

In a somewhat more specific embodiment, the present invention is directed to the method of preparing a hydrocarbon purification catalyst, having hydrogenation propensities, which comprises forming an alumina-silica carrier material containing from about 5% to about 30% by weight of silica, combining threwith from about 5% to about 10% by weight of molybdenum and from about 1% to about 5% by weight of nickel, oxidizing the resulting mixture to form the oxides of nickel and molybdenum, thereafter sulfiding the oxidized composite over a temperature range of about 80° F. to about 800° F. with hydrogen sulfide in a substantially non-reducing atmosphere, and maintaining the thus-sulfided hydrocarbon purification catalyst under a positive hydrogen sulfide pressure of about 5 to about 15 pounds per square inch while the catalyst is being cooled from the highest sulfiding temperature to a temperature below about 300° F.

In another specific embodiment, the use of the present invention yields advantages in a process for the purification of hydrocarbons and mixtures of hydrocarbons, contaminated by sulfurous and nitrogenous compounds, which process comprises passing said contaminated hydrocarbons into a hydrogenation reaction zone, maintained under an imposed hydrogen pressure in excess of about 100 pounds per square inch and containing a hydrocarbon purification catalyst comprising an alumina-silica carrier material composited with the sulfides of molybdenum and nickel, removing from said hydrogenation reaction zone a mixture of normally liquid hydrocarbons and normally gaseous material containing hydrogen sulfide and ammonia, thereafter subjecting said mixture to separation to recover said liquid hydrocarbons substantially free from the aforesaid sulfurous and nitrogenous compounds; said catalyst characterized by the method of preparation which comprises sulfiding an alumina-silica carrier material, composited with the oxides of molybdenum and nickel, with hydrogen sulfide over a temperature range of about 80° F. to about 1000° F. and in a non-reducing atmosphere.

A particularly preferred embodiment of the present invention provides a process for the purification of olefin-containing hydrocarbons and mixtures of hydrocarbons, contaminated by sulfurous and nitrogenous compounds, which process comprises passing said olefin-containing hydrocarbons, at a liquid hourly space velocity of about 1.0 to about 20.0 and in the presencen of recycle hydrogen in an amount of about 1000 to about 5000 standard cubic feet per barrel of said hydrocarbons, into a hydrogenation reaction zone maintained under an imposed pressure of from about 100 pounds per square inch to about 1000 pounds per square inch and an inlet temperature thereto within the range of about 200° F. to about 750° F., said hydrogenation reaction zone containing a hydrogenation catalyst consisting of an alumina-silica carrier material composited with the sulfides of molybdenum and nickel, removing from said hydrogenation zone a mixture of normally liquid saturated hydrocarbons and normally gaseous material containing hydrogen sulfide and ammonia, thereafter separating the normally gaseous material from said mixture and recovering said liquid saturated hydrocarbons substantially free from sulfurous and nitrogenous compounds; said hydrodesulfurization catalyst characterized by the method of preparation which comprises forming an almina-silica carrier material containing about 10% to about 25% by weight of silica, impregnating said carrier material with an impregnating solution containing water soluble molybdenum and nickel compounds to composite therewith from about 5% to about 10% by weight of molybdenum and from about 1% to about 5% by weight of nickel, oxidizing the thus-impregnated carrier material to form an alumina-silica-molybdenum oxide-nickel oxide-composite, thereafter sulfiding the oxidized composite over a temperature range of about 80° F. to about 800° F. with hydrogen sulfide in the absence of hydrogen, and maintaining the thus-sulfided hydrogenation catalyst under a positive hydrogen sulfide pressure of from about 5 to about 15 pounds per square inch while the sulfided catalyst is being cooled to a temperature below about 300° F.

The catalyst composition, provided by this invention in one of its principal embodiments, is characterized by a carrier material which comprises alumina and silica, the latter being present in an amount within the range of about 5% to about 30%, and more preferably, about 10% to about 25% by weight, which carrier material supports sulfided oxides of molybdenum and nickel, having a molybdenum content of not more than about 10% by weight of the catalyst and a nickel content substantially less than that of the molybdenum. The sulfided state of the aforesaid oxides of molybdenum and nickel being that which results from the treatment of the composite of the aforesaid oxides and carrier material, with hydrogen sulfide over a temperature range of from about 80° F. to about 800° F., and substantially in the absence of a reducing atmosphere, and particularly in the absence of hydrogen. In a preferred form of this catalytic composite, the silica is present with the alumina in an amount of about 10% to about 25% by weight, the molybdenum content is less than the silica content and the nickel content is substantially within the range of about 1% to about 5% by weight of the total catalyst.

Processes for effecting the hydrogenation of unsaturated hydrocarbons and hydrocarbon fractions, which processes are shown to effect at least a partially successful pretreatment, or purification, of such hydrocarbons, are well-known and weil-defined within the prior art. These processes generally employ a hydrogenation catalyst consisting of an alumina carrier material which has been combined with catalytically active metallic components of cobalt and molybdenum. The prior art indicates a variety of methods for the preparation of such catalytic composites, as well as a wide range in the composition thereof. The various methods employed for the preparation of the cobalt and molybdenum-containing catalyst include single and double impregnations of the active metallic components, calcination at various elevated temperatures, reduction treatments, the use of various reagents in the impregnating procedure to yield a final composite in which the metallic components exist in some chosen, combined form, etc. Although the hydrogenation processes employing these cobalt and molybdenum containing catalysts may be partially advantageous in treating various hydrocarbons, they fall short of fulfilling the present-day requirements which have been imposed on these processes as a result of the great demand for high quality distillate fuels and catalytically reformed products in large liquid volumetric yield. This demand has brought about a certain degree of criticality, especially with respect to the condition of the particular hydrocarbon charge stock employed in the catalytic reforming process.

As hereinbefore set forth, the platinum-alumina catalyst, widely utilized in various catalytic reforming processes, is detrimentally affected by seemingly insignificant quantities of sulfurous, nitrogenous, and olefinic hydrocarbons. As a result of the increased demand for high-quality motor fuel, and the emphasis placed upon the catalytic reforming processes, as well as the catalytic composite employed therein, there has been created the necessity of insuring an extended, successful period of operation of such processes. One particular means of obtaining this insurance is the preparation, or pretreatment, of the hydrocarbon-stock. The pretreating processes and purification catalyst of the prior art are insufficiently capable of treating the charge stocks to the extent that the same become satisfactory for use in the presently employed catalytic reforming processes. The tolerable degree of concentration of the various contaminants previously described, has been lessened significantly due to the operating demands which have been placed on the catalyst employed within the reforming process. In short, the processes and hydrogenation catalysts of the prior art no longer suffice to purify the charge stock to the extent which is now considered suitable for further processing in a catalytic reforming unit.

The catalyst of the present invention is a four-component ctaalyst comprising an alumina-silica carrier material which has been impregnated with particular quantities of molybdenum and nickel, and subsequently sulfided to yield a final catalyst in which the nickel and molybdenum exist as the sulfides thereof. This catalyst may be utilized to great advantage in processing hydrocarbon charge stocks designed to be utilized in the catalytic reforming process, as well as the purification of various heavy naphthas and cycle stocks which are to be used as fuel and lubricating oils. An essential feature of this invention involves the preparation of such catalyst through the utilization of a precise combination of manufacturing procedures, and especially the means employed for converting the metallic oxides to the highest possible sulfides.

The prior art processes relating to the manufacture of catalytic composites exhibiting hydrogenation and desulfurization propensities, in which processes the catalyst is subjected to a sulfiding technique, employ a sulfiding medium consisting of a mixture of hydrogen sulfide and hydrogen. Generally, in regard to the mixture of hydrogen and hydrogen sulfide, the prior art indicates a particular preference for a gaseous mixture in which the hydrogen is in the greater concentration. The sulfiding technique, employing the aforesaid mixture, is for the expressly stated purpose of obtaining a partial sulfidation of the catalytically active metallic components: It is contended that such "partial" sulfidation results in an increased desulfurization activity. It should be noted, however, that the prior art processes are primarily concerned with the removal or destruction, of sulfurous compounds, such as mercaptans, thiophenes, etc., and not with the necessity of effecting the substantially complete removal of nitrogenous compounds. I have found that hydrocarbon purification catalysts, comprising particular concentrations of molybdenum and nickel, and pre-sulfided in accordance with the method of the present invention, exhibit an unusually high degree of activty with respect to the removal of nitrogenous compounds.

The utilization of a sulfiding mixture of hydrogen and hydrogen sulfide, as proposed by the prior art, must of necessity result in a non-homogeneous catalyst, particularly with respect to the existing combined state of the catalytically active components. There is produced a catalyst in which the metallic components exist as a mixture of the oxides, hydroxides, sulfides, and in regard to the latter, various combined forms thereof. Variations in the hydrogen sulfide concentration within the sulfiding medium, as the sulfiding procedure is being effected, result in catalysts which vary in the quantity of sulfur combined with the metallic components, the spread within a given quantity of an allegedly homogeneous catalyst being as great as four weight percent. Through the use of the method of the present invention, in which the sulfiding medium comprises hydrogen sulfide, and particularly in the absence of hydrogen, the catalytically active metallic components are caused to exist in their highest possible sulfided state, and the catalytic composite finally produced, is especially homogeneous with respect to its composition.

As hereinbefore set forth, the most common contaminants found in the various hydrocarbons, and hydrocarbon distillates, are olefinic hydrocarbons, nitrogeneous compounds and sulfurous compounds. With respect to these contaminants, the hydrogenation of the olefinic hydrocarbons, to yield paraffins and cyclic paraffins, is most easily effected; the conversion of the sulfurous compounds into the hydrocarbon counterpart and hydrogen sulfide is somewhat more difficult, whereas the removal of nitrogenous compounds through the conversion of the same into the hydrocarbon counterpart and ammonia, is the most difficult to obtain, especially since the injurious level of the concentration of nitrogenous compounds is so much lower than that of the sulfurous and olefinic compounds. The degree of success, in regard to the elimination of nitrogenous compounds is dependent upon many considerations, including the quantity thereof within the hydrocarbon being processed, the various physical and chemical characteristics of the hydrocarbon and the concentrations therein of the olefinic hydrocarbons and the sulfurous hydrocarbons. Previous experience has been that the hydrogenation catalyst suffers a loss of activity for effecting the removal of nitrogenous compounds, as the necessary degree of olefinic saturation and sulfurous hydrocarbon removal is increased. The activity of the four-component catalyst of the present invention, in regard to the removal of nitrogenous compounds, is more than twice that exhibited by the widely utilized alumina-cobalt-molybdenum catalyst of the prior art, and is unaffected by the required degree of activity with respect to the concentrations of various other contaminants. The increased removal of nitrogen results in a definite improvement in the subsequent catalytic reforming operations, and also permits the inclusion of greater quantities of cracked gasolines within the charge stocks to such reforming processes. In the case of intermediate naphthas, and light and heavy gas oils, the greater removal of nitrogen compounds affords improved color and storage stability since these nitrogen compounds exhibit the tendency to form gums and varnishes.

The four-component catalyst is prepared by initially coprecipitating the alumina-silica carrier material to contain the desired quantity of silica, and within the range of about 10% to about 30% by weight. The formed carrier material is then impregnated with a single impregnating solution containing suitable water-soluble molybdenum and nickel compounds. Following this single impregnating procedure, the resulting alumina-silica-molybdenum-nickel composite is dried to remove excessive moisture, and calcined in an atmosphere of air to convert the catalytically active metallic components, molybdenum and nickel, to the oxides thereof. The oxidized composite is then subjected to the sulfiding technique by first being cooled to approximately room temperature, about 80° F., and contacted at this temperature with the gaseous sulfiding medium of hydrogen sulfide. An essential limitation of the sulfiding technique is that the same be effected in a non-reducing atmosphere, and particularly in the absence of hydrogen. Further, it is preferred that the catalyst, following the calcination procedure, is purged with some suitable inert material, such as nitrogen, argon, carbon monoxide, etc., in order to remove any residual free oxygen prior to instituting the sulfiding technique. Thus, the gaseous medium employed in the sulfiding technique of the present invention constitutes unadulterated hydrogen sulfide: it is understood that this is not intended to preclude the use of a suitable inert substance, in conjunction with the hydrogen sulfide, for the purpose of effecting temperature control during the sulfiding technique, or, in order to control the effective rate of sulfidation. Thus, it is within the broad scope of the present invention to utilize a mixture of 50% hydrogen sulfide and 50% nitrogen. The concentration of hydrogen sulfide, during the sulfiding procedure, is within the range of about 30% to about 100%, and not substantially less than 30%. The temperature of the composite during the sulfiding procedure (instituted at room temperature) is increased to a level of about 750° F., and the sulfiding continued at this temperature for a period of about one hour. In many instances, it may be necessary to increase the temperature, during the sulfiding procedure, to about 1000° F. or higher. Generally, however, these high temperatures are not required, and the maximum sulfiding temperature need not exceed about 700° F. to 800° F. Following the complete sulfidation of the catalytically active metallic components, the nitrogen flow, where utilized as an inert diluent, is stopped, and hydrogen sulfide is introduced intermittently to maintain a positive pressure of hydrogen sulfide on the sulfided catalyst, while the latter is being cooled to a temperature below about 300° F. When the temperature of the sulfided catalyst is below 300° F., a stream of suitably inert gaseous material such as nitrogen may be employed to cool the sulfided catalyst further in order to facilitate handling and storage.

Various modifications of this procedure may be employed to yield a catalytic composite possessing a high degree of activity in regard to the removal of sulfurous and nitrogenous compounds, in addition to the saturation of olefinic hydrocarbons. Such modifications include the single and double impregnating techniques; that is, the active metallic components may be individually and separately composited with the carrier material while employing calcination procedures following each individual impregnation. The order in which the metallic components are combined may be altered without removing the particular method of manufacture from the broad scope of the present invention. In addition, various sulfiding techniques utilizing hydrogen sulfide in the absence of hydrogen, may be employed, however, the more active catalysts are produced by the method which comprises initially contacting the catalyst with hydrogen sulfide at essentially room temperature, and maintaining such contact while the catalyst is being heated to the elevated temperature at which the greater portion of sulfidation takes place, a temperature of about 700° F. to 800° F. or higher. In those instances where the hydrogen sulfide is to be commingled with a suitable inert material, such as nitrogen, it is necessary that the concentration of hydrogen sulfide be greater than about 30% of the mixture. A sulfiding medium consisting of 90% nitrogen and 10% hydrogen sulfide yields a catalytic composite lacking in homogeneity and uniformity of physical characteristics. It is understood that the use of the various modifications above described does not yield equivalent results.

Beneficial results are obtained through the use of an alumina-silica carrier material having a silica content of about 5% to about 30% by weight. However, to avoid excessive hydrocracking, while obtaining the beneficial aspects of the combination, it is preferred that the silica content be intermediate the aforesaid range and from about 10% to about 25% by weight. It is understood that these slight modifications of the particularly preferred procedure do not remove the method of catalyst preparation from the broad scope of the present invention. The present invention is to be limited only within the scope and spirit of the appended claims.

An essential feature of the present invention is that the sulfiding technique, utilizing 100% hydrogen sulfide, or hydrogen sulfide diluted to 30% by volume with an inert gaseous diluent, be effected in a non-reducing atmosphere. That is to say, care should be taken to exclude those materials which normally exhibit reducing propensities, and it is particularly important to exclude hydrogen from the sulfiding atmosphere. Other examples of gaseous substances which normally act as reducing agents are methane, ammonia, ethylene, arsene, stibine, carbon monoxide, nitrous oxide and nitric oxide, etc. Although hydrogen sulfide may, under certain conditions, exhibit reducing tendencies, it is obviously not intended to include it in the classification of reducing agents.

The following examples are given for the purpose of illustrating the method by which the catalyst of the present invention is prepared. Insignificant changes in the conditions, reagents and concentrations employed in these examples, are not considered to be outside the broad scope of the present invention.

In the following examples, reference is made to a "Standard Relative Activity" test method. The relative activity of a particular catalyst is defined therein as the ratio of the space velocity required to result in a given product improvement, while employing the test catalyst, to the space velocity required to yield the same degree of product improvement while employing a primary, standard catalyst, the relative activity being expressed as a percentage. The catalyst employed as the standard catalyst, in the formation of reference curves, is an alumina-cobalt-molybdenum composite consisting of about 1.0% by weight of cobalt and about 5.7% by weight of molybdenum. The product quality improvement is measured in terms of the residual basic nitrogen content of the liquid product: As hereinbefore stated, the removal of nitrogenous compounds is that function of a hydrodesulfurization catalyst most difficult to effect, and, therefore, the relative activity of a given catalyst is more logically based thereon, rather than on an improvement in either the sulfur concentration, or the quantity of olefinic hydrocarbons as indicated by the bromine number.

The relative activity test method consists essentially of processing a particular middle fraction of a California thermally-cracked naphtha; the middle fraction is that portion which boils within the range of 290° F. to 390° F. The catalyst to be subjected to the activity test is placed in a reaction zone in an amount of 50 cubic centimeters, and a hydrogen pressure of 800 pounds per square inch is imposed thereon. The catalyst bed inlet temperature is maintained at a level of 700° F., and hydrogen is passed therethrough (on a once-through basis) in an amount of 3000 standard cubic feet per barrel of liquid charge. Three separate test procedures are effected at various liquid hourly space velocities within the range of about 2 to about 10. The three liquid effluents, upon which individual product inspections are made, are collected over a period of operation of about 4 to about 7 hours. The thermally-cracked naphtha fraction, employed as the test charge stock, is further characterized in that the concentration of the contaminants contained therein is 1.33% by weight of sulphur, 300 p.p.m. of basic nitrogen, and a quantity of unsaturated hydrocarbons which indicate a bromine number of 61. The basic nitrogen concentrations of each of the three liquid products are plotted on a logarithmic scale against the reciprocals of the three space velocities employed. From the resulting curve, drawn through the three points, a determination is made of the reciprocal of the space velocity required to yield a liquid product having a residual basic nitrogen content of 2 p.p.m. The relative activity of the test catalyst is derived from the ratio of the reciprocal space velocity, to yield 2 p.p.m. of basic nitrogen, in regard to the primary standard catalyst and compared to that of the catalyst being tested. The ratio is multiplied by the factor of 100, and a relative activity factor (RAF) greater than 100% indicates a test catalyst having a greater activity than the primary standard catalyst; obviously, a catalyst having a relative activity factor less than 100, is less active than the primary standard catalyst.

EXAMPLE I

As hereinbefore stated, the standard hydrogenation-purification catalyst, most commonly employed, consists essentially of cobalt and molybdenum, composited with an alumina carrier material. For the purpose of comparing the catalysts of the present invention, and the results obtained through the use thereof, a catalyst, to be employed as the standard, was prepared by impregnating ⅛"x⅛" alumina pills with a single impregnating mixture of molybdic acid containing 85% by weight of molybdenum oxide and sufficient cobalt nitrate hexahydrate to composite about 2.2% by weight of cobalt. Following the impregnation, this standard catalyst was subjected to drying and calcination in an atmosphere of air at an elevated temperature of about 900° F. The calcined catalyst was analyzed and found to contain 6.0% by weight of molybdenum and 2.2% by weight of cobalt, calculated as the elemental metal. The metals exist as the oxides thereof, and, therefore, the composition of the catalyst was about 87% by weight of alumina, about 10% by weight of molybdenum oxide and about 3% by weight of cobalt oxide. This catalyst, designated as catalyst "A," was subjected to the relative activity test by processing the thermally-cracked, California naphtha therethrough. The charge stock, previously characterized, was passed into a reactor fabricated from 1-inch, schedule 80, type 316 stainless steel. The reactor was equipped with a thermocouple well to which perforated baffle plates were fastened to serve as the vaporization, preheating and mixing zone for the recycle hydrogen and the liquid hydrocarbon charge. The reactor contained a single catalyst bed of approximately 50 cubic centimeters, and was maintained under an imposed hydrogen pressure of 800 pounds per square inch, the hydrogen being recycled at a rate of 3000 standard cubic feet per barrel of liquid charge; the inlet temperature to the catalyst bed was 700° F. The standard hydrogenation catalyst, containing 6.0% by weight of molybdenum and 2.2% by weight of cobalt, when subjected to the relative activity test, indicated an RAF (relative activity factor) of 110%. The increase of 10% over the standard primary catalyst, hereinbefore described, is, in all probability, due to the fact that the relative activity reference curves are based on a primary catalyst consisting of 5.7% by weight of molybdenum and 1.2% by weight of cobalt, whereas catalyst "A" contained an additional 0.3% by weight of molybdenum and 1.2% of cobalt.

A portion of catalyst "A," which had not been subjected to the relative activity test, was sulfided in accordance with the method of the present invention. The catalyst portion, designated as catalyst "B," was placed in a stainless-steel chamber similar to that employed as the reaction chamber in the test procedure, and contacted therein at a temperature of 80° F., with a stream of 100% hydrogen sulfide. While the hydrogen sulfide was passing therethrough, the catalyst temperature was increased to a level of 750° F., which temperature was maintained for a period of fifteen minutes. The catalyst was permitted to cool to a temperature of 300° F., accompanied by the intermittent introduction of hydrogen sulfide for the purpose of maintaining a positive pressure on the sulfided catalyst during the cooling period. When the temperature reached 300° F., the flow of hydrogen sulfide was completely stopped, and the catalyst was further cooled with a stream of nitrogen. The catalyst was then subjected to the relative activity test procedure, and indicated an RAF of 130%. This example clearly indicates the beneficial results obtained through the use of the sulfiding technique embodied by the present invention. There is produced thereby, an increase of 20 units, RAF, in the activity of the standard type hydrogenation catalyst.

EXAMPLE II

Three additional catalysts were prepared, each of which was subjected to the sulfiding technique as set forth in Example I. In all of these catalysts, the refractory carrier material was impregnated with the molybdic acid solution in an amount to yield 6.0% by weight of molybdenum. In addition, the impregnating solution contained, in all three instances, sufficient nickel nitrate hexahydrate, in aqueous solution, to deposit 2.0% by weight of nickel (computed as the element) with the carrier material and the molybdenum. In effect, there was a direct substitution of a like quantity of the nickel component for the cobalt component of the standard primary catalyst.

The refractory carrier material was alumina, in the case of the first catalyst, designated as catalyst "C," whereas, in accordance with one of the preferred embodiments of my invention, silica was added to carrier material of catalysts "D" and "E." These carrier materials were prepared in the identical manner, but designedly to contain different quantities of silica. To prepare the alumina-silica refractory material, water glass containing 28% by weight of $SiO_2$ (1.38 specific gravity) was diluted with water and added to an aqueous solution of hydrochloric acid containing 32% by weight of hydrogen chloride. The water glass was used in an amount to yield a final catalytic composite, in one case, containing 10% by weight of silica, and, in the second case, 25% by weight of silica. These two silica-containing catalysts are respectively designated as catalysts "D" and "E."

Separately, aluminum sulfate in aqueous solution (1.31 specific gravity), was commingled with the hydrochloric acid-water glass mixtures above described. The silica-alumina was co-precipitated from the resulting solution through the addition of 28% by weight ammonium hydroxide, (0.90 specific gravity). The precipitate was filtered to remove excessive water, and then dried to a volatile-matter content of about 17% to about 20% by weight. The dried material was ground to a powder and formed into ⅛" x ⅛" cylindrical pills. The pills were then calcined at an elevated temperature of 1240° F. for a period of three hours. As hereinabove described, the calcined pills were impregnated with the molybdenum and nickel compounds to composite the desired quantities thereof. The three catalysts were individually and separately sulfided in accordance with the method of the present invention, and thereafter subjected to the relative activity test procedure.

The results of the activity testing and, for the purpose of clarity and simplicity, the compositions of the catalytic composites, are given in the following Table I. The results and composition of the standard hydrogenation catalyst, catalyst "A," are repeated to facilitate the comparison.

Table I

| Catalyst Designation | A | C | D | E |
|---|---|---|---|---|
| Catalyst Composition,[1] wt. percent: | | | | |
| Molybdenum | 6.0 | 6.0 | 6.0 | 6.0 |
| Silica | | | 10.0 | 25.0 |
| Cobalt | 2.0 | | | |
| Nickel | | 2.0 | 2.0 | 2.0 |
| Relative Activity Factor | 110 | 193 | 234 | 237 |

[1] In all instances, the remainder of the catalytic composite was alumina.

The results of applying the method of the present invention are readily ascertained by comparing the relative activity factors. The incorporation of the nickel component and the utilization of the particular sulfiding technique, have resulted in a catalytic composite possessing unusually high activity. A further increase in this high activity has been accomplished through the addition of silica in amounts within the range of 10% to 25% by weight. There is some indication that an additional increase in activity is obtained when care is taken to insure against the presence of halogen during the impregnation procedure. When the results obtained from catalysts "C," "D" and "E" are compared with those obtained with catalyst "B," the latter being the standard hydrogenation catalyst sulfided according to my method and having an RAF of 130% (as shown in Example I), the unexpected advantages of utilizing the combination of nickel and silica are clearly ascertained. The beneficial results of the four-component catalyst, sulfided in accordance with the present invention, are clearly shown to be distinct improvements over those obtained from the standard hydrogenation catalyst.

EXAMPLE III

A series of three catalysts designated as "F," "G" and "H," were prepared, each being subjected to a sulfiding technique dissimilar to that of the present invention, and each containing a fifth catalytic component, namely cobalt in an amount of 0.2% by weight of the final catalytic composite. A fourth catalyst, designated as catalyst "J," also containing 0.2% by weight of cobalt, was sulfided according to the method of the present invention. All four catalysts were subjected to the relative activity test individually, and the results compared for the purpose of illustrating the adverse effects of utilizing a sulfiding technique in the presence of a reducing atmosphere. Catalyst "F" was sulfided by the method consisting of passing hydrogen therethrough at a temperature of 650° C., followed by ⅔ $H_2S$—⅓ $H_2$ at a temperature of 400° C.; catalyst "G" was sulfided in a stream consisting of ⅓ $H_2S$ and ⅔ $H_2$, at a temperature of 400° C.; catalyst "H" was sulfided with a gaseous stream consisting of ⅔ $H_2S$ and ⅓ $H_2$, at a temperature of 400° C.; catalyst "J" was sulfided according to the method of the present invention at a temperature of 400° C. The results of the relative activity testing are given in the following Table II:

Table II

| Catalyst Designation | A | F | G | H | J |
|---|---|---|---|---|---|
| Catalyst Composition, wt. percent: | | | | | |
| Molybdenum | 6.0 | 6.0 | 6.0 | 6.0 | 6.0 |
| Nickel | | 2.0 | 2.0 | 2.0 | 2.0 |
| Cobalt | | | 0.2 | 0.2 | 0.2 |
| Silica | 2.0 | | | | 0.2 |
| | | 12.0 | 12.0 | 12.0 | 12.0 |
| Relative Activity Factor, percent | 110 | 87 | 146 | 163 | 171 |

It should be noted that the sulfiding technique of the present invention resulted in the catalyst having the highest relative activity. Furthermore, the tabulated data indicate that a molybdenum-nickel hydrogenation catalyst, containing a minor quantity of cobalt to impart thereto a particular degree of stability, is significantly benefitted through the use of the present invention. Although the catalyst containing 0.2% by weight of cobalt as the fifth component is not shown to be as active as the four-component catalyst (RAF of 234 and 237 as shown in Table I), the sulfiding technique is shown to have resulted in a highly active catalyst intended to possess stability. This five component catalyst, therefore, would be extremely advantageous in those processes for the hydrogenation of heavier hydrocarbons and fuel oils which are not excessively contaminated, in which processes stability is more highly desired than an exceedingly high activity.

The foregoing examples indicate the method of the present invention, and the benefits to be derived through the utilization thereof; it is not intended to limit unduly the invention to these examples, but only within the spirit and scope of the appended claims.

I claim as my invention:

1. The method of preparing a hydrocarbon purification catalyst, having hydrogenation propensities, which comprises forming an alumina-silica carrier material containing from about 10% to about 25% by weight of silica, combining therewith from about 5% to about 10% by weight of molybdenum and from about 1% to about 5% by weight of nickel, oxidizing the resulting mixture to form the oxides of nickel and molybdenum, thereafter sulfiding the oxidized composite over a temperature range increasing from about 80° F. to about 800° F. with hydrogen sulfide in a substantially non-reducing atmosphere, and maintaining the thus-sulfided hydrocarbon purification catalyst under a positive hydrogen sulfide pressure of about 5 to about 15 pounds per square inch while the catalyst is being cooled from the highest sulfiding temperature to a temperature below about 300° F.

2. The method of claim 1 further characterized in that the sulfiding of the oxidized composite is effected in the absence of hydrogen.

3. A process for the purification of hydrocarbons and mixtures of hydrocarbons, contaminated by sulfurous and nitrogenous compounds, which comprises passing said contaminated hydrocarbons into a hydrogenation reaction zone, maintained under an imposed recycle hydrogen pressure within the range of about 100 pounds per square inch to about 1000 pounds per square inch, and containing a hydrocarbon purification catalytic composite consisting of an alumina-silica carrier material composited with the sulfides of molybdenum and nickel, removing from said hydrogenation reaction zone a mixture of normally liquid hydrocarbons and normally gaseous material containing hydrogen sulfide and ammonia, and thereafter separating said mixture to remove the normally gaseous material and to recover said liquid hydrocarbons substantially free from sulfurous and nitrogenous compounds; the aforesaid catalytic composite characterized by the method of preparation which comprises forming an alumina-silica carrier material containing about 10% to about 25% by weight of silica, impregnating said carrier material with aqueous solutions of molybdenum and nickel compounds to composite therewith from about 5% to about 10% by weight of molybdenum and from about 1% to about 5% by weight of nickel, oxidizing the thus-impregnated carrier material to form an alumina-silica-molybdenum oxide-nickel oxide-composite, thereafter sulfiding the oxidized composite over a temperature range increasing from about 80° F. to about 800° F. with hydrogen sulfide in a non-reducing atmosphere, and maintaining the thus-sulfided catalyst under a positive hydrogen sulfide pressure of about 5 to about 15 pounds per square inch while the sulfided catalyst is being cooled to a temperature below about 300° F.

4. A process for the purification of hydrocarbons and mixtures of hydrocarbons, contaminated by sulfurous and nitrogenous compounds, which comprises passing said hydrocarbons, at a liquid hourly space velocity of from about 1.0 to about 20.0, into a hydrogenation reaction zone maintained under an imposed hydrogen pressure of from about 100 pounds per square inch to about 1000 pounds per square inch and at an inlet temperature thereto within the range of about 200° F. to about 750° F., said reaction zone containing a hydrogenation catalyst consisting of an alumina-silica carrier material composited with the sulfides of molybdenum and nickel, removing from said hydrogenation zone a mixture of normally liquid hydrocarbons and normally gaseous material containing hydrogen sulfide and ammonia, thereafter separating said normally gaseous material from said mixture to recover said liquid hydrocarbons substantially free from sulfurous and nitrogenous compounds; the aforesaid hydrogenation catalyst characterized by the method of preparation which comprises forming an alumina-silica carrier material, containing from about 10% to about 25% by weight of silica, impregnating said carrier material with aqueous solutions of molybdenum and nickel compounds to composite therewith from about 5% to about 10% by weight of molybdenum and from about 1% to about 5% by weight of nickel, oxidizing the resulting impregnated composite to form an alumina-silica-molybdenum oxide-nickel oxide composite, thereafter sulfiding the oxidized composite over a temperature range increasing from about 80° F. to about 800° F. with hydrogen sulfide in the absence of hydrogen and maintaining the thus sulfided catalyst under a positive hydrogen sulfide pressure of about 5 to about 15 pounds per square inch while the sulfided catalyst is being cooled to a temperature below about 300° F.

5. The process of claim 4 further characterized in that the imposed hydrogen pressure within the hydrogenation reaction zone results from compressive hydrogen recycle in an amount of from about 1000 to about 5000 standard cubic feet per barrel of the liquid hydrocarbons charged to the reaction zone.

6. A process for the purification of olefin-containing hydrocarbons and mixtures of hydrocarbons, contaminated by sulfurous and nitrogenous compounds, which comprises passing said olefin-containing hydrocarbons, at a liquid hourly space velocity of about 1.0 to about 20.0 and in the presence of recycle hydrogen in an amount of about 1000 to about 5000 standard cubic feet per barrel of said hydrocarbons, into a hydrogenation reaction zone maintained under an imposed pressure of from about 100 pounds per square inch to about 1000 pounds per square inch and an inlet temperature thereto within the range of about 200° F. to about 750° F., said hydrogenation reaction zone containing a hydrogenation catalyst consisting of an alumina-silica carrier material composited with the sulfides of molybdenum and nickel, removing from said hydrogenation zone a mixture of normally liquid saturated hydrocarbons and normally gaseous material containing hydrogen sulfide and ammonia, thereafter separating the normally gaseous material from said mixture and recovering said liquid saturated hydrocarbons substantially free from sulfurous and nitrogenous compounds; said hydrodesulfurization catalyst characterized by the method of preparation which comprises forming an alumina-silica carrier material containing from about 10% to about 25% by weight of silica, impregnating said carrier material with an aqueous impregnating solution containing molybdenum and nickel compounds to composite therewith from about 5% to about 10% by weight of molybdenum and from about 1% to about 5% by weight of nickel, oxidizing the thus-impregnated carrier material to form an alumina-silica-molybdenum oxide-nickel oxide composite, thereafter sulfiding the oxidized composite over a temperature range increasing from about 80° F. to about 800° F. with hydrogen sulfide in the absence of hydrogen, and maintaining the thus-sulfided hydrogenation catalyst under a positive hydrogen sulfide pressure of from about 5 to about 15 pounds per square inch while the sulfided catalyst is being cooled to a temperature below about 300° F.

References Cited in the file of this patent

UNITED STATES PATENTS

| | | |
|---|---|---|
| 2,894,903 | McGrath et al. | July 14, 1959 |
| 2,905,636 | Watkins et al. | Sept. 22, 1959 |